(No Model.)
A. P. HEIDT.
FIRE SHOVEL AND TONGS.
No. 349,394. Patented Sept. 21, 1886.
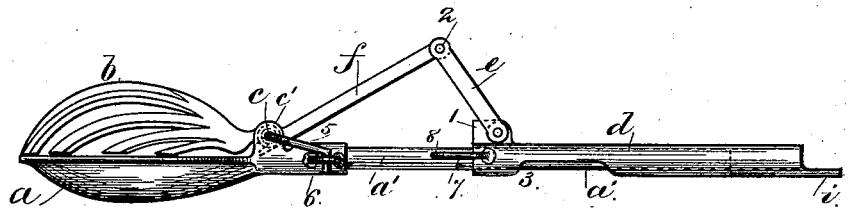
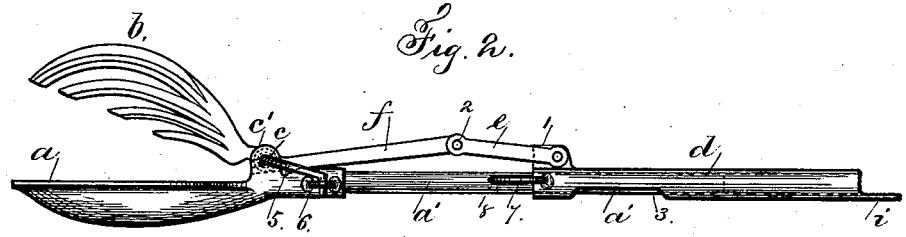
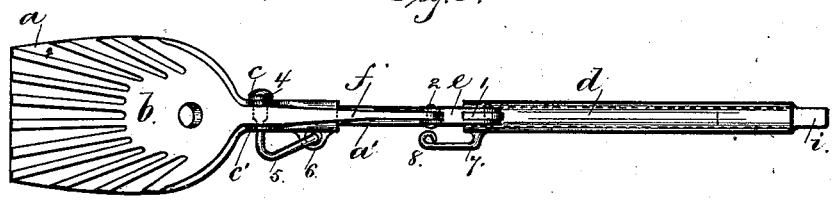
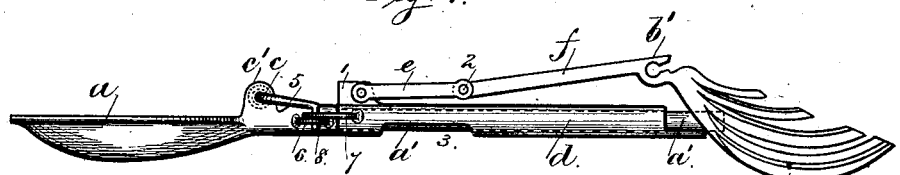
Witnesses.
Harold Serrell
Chas. H. Smith
Inventor
Allen P. Heidt
per Lemuel W. Serrell
Atty.
N. PETERS, Photo-Lithographer, Washington, D. C.

UNITED STATES PATENT OFFICE.

ALLEN P. HEIDT, OF NEW YORK, N. Y.

FIRE SHOVEL AND TONGS.

SPECIFICATION forming part of Letters Patent No. 349,394, dated September 21, 1886.

Application filed March 26, 1886. Serial No. 196,638. (No model.)

*To all whom it may concern:*

Be it known that I, ALLEN P. HEIDT, of the city, county, and State of New York, have invented a new and useful Improvement in Fire Shovel and Tongs, of which the following is declared to be a full and exact description.

Shovels and tongs for handling coal and ashes have heretofore been made; but the same have generally been separate implements.

My invention is a combined shovel and claw forming tongs which are adapted to open and shut in handling coal, ashes, &c., and to be held in the hand either open or shut, and, if desired, the claw can be swung back and placed upon the opposite end of the handle-bar.

In the drawings, Figure 1 is a side elevation of my improved shovel and claw as shut. Fig. 2 is an elevation of the same as open. Fig. 3 is a plan view. Fig. 4 is an elevation with the claw disconnected from the shovel and secured to the outer end of the handle-bar. Fig. 5 is a plan of the shovel and pivot.

$a$ is the fire-shovel, and $a'$ a rod or handle connected therewith. $b$ is the fingered claw, made with an arm, $f$, extending out from the claw, and this is connected to the shovel $a$ by a movable pivot, $c$, that passes through the joint-plates $c'$ upon the handle $a'$, the handle portion passing in between such joint-plates, and having a slotted pivot-hole for the pivot $c$, and upon the pivot $c$ said claw can be opened or closed toward the shovel. There is a sliding sleeve, $d$, upon the rod $a'$, and there is a lug, 1, upon said sleeve, and a link, $e$, pivotally connected thereto at one end, the other end of the link $e$ being pivoted at 2 to the end of an arm, $f$, formed with the claw $b$, and the movement of the sleeve $d$ back and forth upon the rod $a'$ operates the link $e$ and arm $f$ to open or shut the claw of the tongs. I prefer to remove a portion of the sleeve $d$ at 3, so that the fingers of the party using the implement may take a bearing against the rod $a'$, and thus prevent the parts moving when handling the shovel or tongs. The pivot $c$ is made of larger diameter near the head 4 than at the portion 5, and the end of said pivot is curved and bent as a hook to pass into an eye, 6, upon the shank of the shovel. The slot of the pivot-hole is large enough to pass over the portion 5 of the pivot, and the pivot-hole is the same size as the larger portion next the head 4, so that the jaw $b'$ can be inserted between the joint-plates $c$ by passing the open slot over the pivot, which pivot is then pushed endwise to bring the larger part into the pivot-hole, and then the hooked end is passed into the eye 6, and the handle of the claw cannot be withdrawn. Upon the end of the sleeve, at 7, there is a bent arm, with an eye, 8, at its outer end, and when the jaw and tongs are removed and swung over into the position shown in Fig. 4 the eye 8 comes over the eye 6. The end of the pivot-hook $c$ passes through both eyes and holds the parts rigidly. In this position the end of the handle-rod $a'$ passes through a hole in the middle part of the claw $b$, and the shovel and claw are at opposite ends of the handle $a'$, and can be used separately.

I prefer to make the end of the sliding sleeve $d$ as a projecting finger, $i$, to be used as a stove-lid lifter.

My improved shovel and tongs can be made as herein described, and of small size, adapted for table use, for handling lump-sugar, pickles, &c. The part $a$ may be made as a spoon or slotted to make a claw, the devices for operating the parts being unchanged.

I claim as my invention—

1. The shovel $a$ and its round handle $a'$, the pivot-pin $c$, bent at 5, and the eye 6, to hold the pivot-pin, in combination with the sliding sleeve $d$, surrounding the handle and moving thereon, the claw $b$ and its arm $f$, removably pivoted upon the handle $a'$, and the link $e$, connecting the arm $f$ to the sliding sleeve $d$, substantially as set forth.

2. The combination, with the shovel $a$ and handle $a'$, and the joint-plates $c'$ upon the shank of the handle, of the claw $b$ and its arm or handle $f$, sliding sleeve $d$, the link $e$, a pivot-pin, $c$, and an eye, 8, and bent arm upon the sliding sleeve $d$, substantially as specified.

3. The combination, with the shovel $a$, handle $a'$, claw $b$, and arm $f$, of the jaw $b'$ at the base of the claw, said jaw being provided with a slotted pivot-hole, a pivot-pin, $c$, with one part of small and the other part of larger diameters, and joint-plates $c'$ upon the shank of the shovel $a$, through which the pivot passes, substantially as specified.

4. The combination, with the shovel $a$ and its handle-bar $a'$, and the sleeve $d$, sliding upon the bar $a'$, of a claw, $b$, and its arm $f$, and the link $e$, pivotally connected to the arm and sliding sleeve, the claw $b$ having an opening and adapted to receive the end of the handle $a'$, and the pivot $c$ and its hooked end 5, and the eye 8, for securing the parts in position, as set forth.

Signed by me this 23d day of March, A. D. 1886.

ALLEN P. HEIDT.

Witnesses:
HAROLD SERRELL,
WILLIAM G. MOTT.